3,651,083
TETRA- AND HEXAHYDRO-PHENYLPYRROLO BENZODIAZEPINES AND INTERMEDIATES
Jackson B. Hester, Jr., Portage, Mich., assignor to The Upjohn Company, Kalamazoo, Mich.
No Drawing. Filed Nov. 3, 1969, Ser. No. 873,691
Int. Cl. C07d 53/02, 53/06
U.S. Cl. 260—326.5 B          13 Claims

ABSTRACT OF THE DISCLOSURE 1,2,4,5 - tetrahydropyrrolo[3,2,1 - jk][1,4]benzodiazepines, 1,2,4,5,6,7-hexahydro-7-phenylpyrrolo[3,2,1-jk][1,4]benzodiazepines, 4,5,6,7-tetrahydro-7-phenylpyrrolo[3,2,1-jk][1,4]benzodiazepines, 1,2,4,5,6,7 - hexahydro - 6-phenylpyrrolo[1,2,3-ef][1,5]benzodiazepines and processes for preparing the same. The novel benzodiazepines exhibit tranquilizing and anticonvulsant activity in animals.

BRIEF SUMMARY OF THE INVENTION

This invention relates to novel 1,2,4,5-tetrahydropyrrolo[3,2,1-jk][1,4]benzodiazepines (I), 1,2,4,5,6,7-hexahydro-7-phenylpyrrolo[3,2,1-jk][1,4]benzodiazepines (II), 4,5,6,7-tetrahydro-7 - phenylpyrrolo[3,2,1-jk][1,4]benzodiazepines (III), 1,2,4,5,6,7-hexahydro-6-phenylpyrrolo[1,2,3-ef][1,5]benzodiazepines (IV) and processes for preparing the same.

The novel compounds of this invention have the formulae:

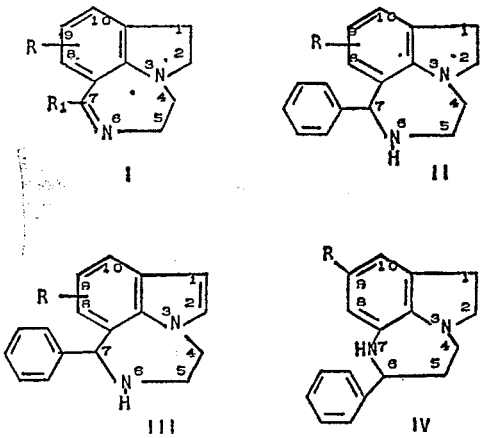

wherein R is selected from the group consisting of hydrogen, alkyl of from 1 to 3 carbon atoms, inclusive, alkoxy of from 1 to 3 carbon atoms, inclusive, bromo, chloro and fluoro; and $R_1$ is methoxy, ethoxy or phenyl.

The term "novel compounds" as used throughout the specification embraces compounds represented by Formulas I, II, III, IV and the acid addition salts thereof. The term "alkyl" is inclusive of methyl, ethyl, propyl and isopropyl. The term "alkoxy" is inclusive of methoxy, ethoxy, propoxy and isopropoxy.

The compounds of Formulae I, II, III and IV can be prepared by processes represented by the following equations.

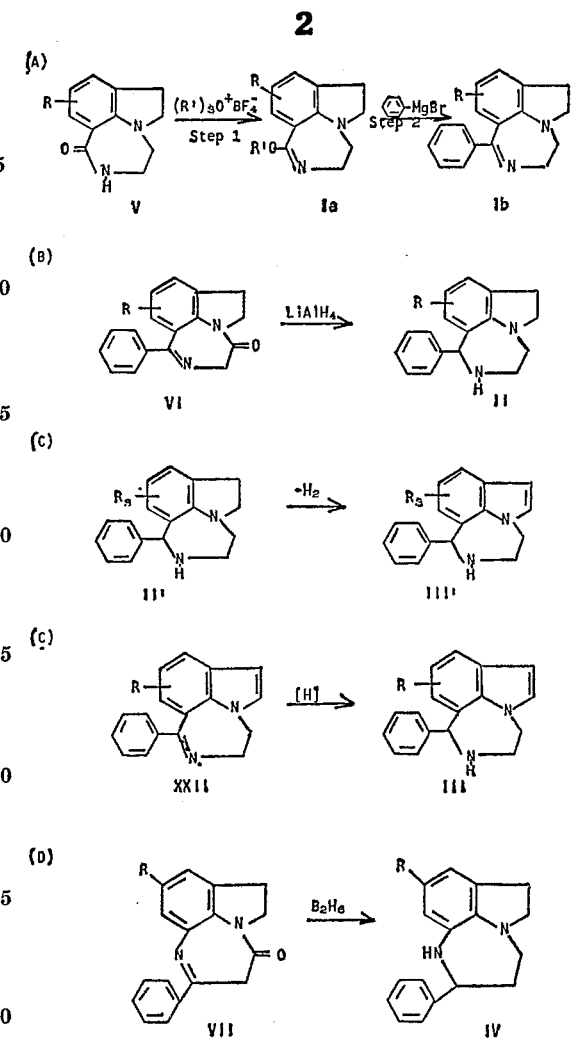

wherein R is the same as above, R' is ethyl or methyl, and $R_3$ is hydrogen, alkyl of from 1 to 3 carbon atoms, inclusive, or alkoxy of from 1 to 3 carbon atoms, inclusive.

DETAILED DESCRIPTION

Process A

Step 1 is carried out by treating a solution or suspension of the appropriate 1,2,4,5-tetrahydropyrrolo[3,2,1-jk][1,4]benzodiazepin-7(6H)-one (V) in an inert solvent such as methylene chloride, with a solution of trimethyl- or triethyloxonium fluoroborate in the same inert solvent and allowing the mixture to stand at 25–50° C. for 5–24 hours to yield the imino ether (Ia). Triethyloxonium fluoroborate can be prepared by adding epichlorohydrin to a solution of boron trifluoride etherate in diethyl ether [Meerwein et al., J. Prakt. Chem. 147 (2), 257 (1937). Trimethyloxonium fluoroborate can be prepared by the reaction of triethyloxonium fluoroborate with dimethyl ether [Meerwein, Organic Syntheses 46, 120 (1966)].

Step 2 is carried out by adding a solution of phenylmagnesium bromide in diethyl ether to a solution of the imino ether (Ia) in dibutyl ether. The diethyl ether is then removed by distillation and the resulting mixture is refluxed for 2–8 hours to yield the 1,2,4,5-tetrahydro-7-phenylpyrrolo-[3,2,1-jk][1,4]benzodiazepine of Formula Ib. The product Ib is recovered from the reaction mixture by conventional procedures such as crystallization, evaporation, chromatography and combinations thereof.

The 1,2,4,5 - tetrahydropyrrolo[3,2,1-jk][1,4]benzodiazepin-7(6H)-ones (V) utilized in step 1 can be prepared by the process illustrated by the following equations.

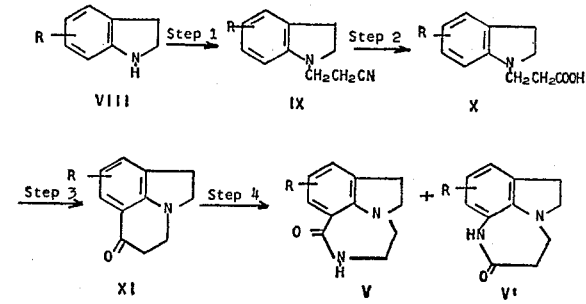

wherein R is the same as above.

Step 1 involves reacting the appropriate indoline (VIII) with acrylonitrile to form a 1-indol inepropionitrile (IX). In step 2, the 1-indol inepropionitrile is converted to the corresponding 1-indolinepropionic acid (X). Step 3 involves heating the 1-indol inepropionic acid with polyphosphoric acid to form a 1,2,4,5-tetrahydro-6H-pyrrolo-[3,2,1-ij]quinol in-6-one (XI). The conditions utiilzed in these three steps are described in considerable detail in Rapoport et al., J. Org. Chem. 23, 248 (1958).

In step 4, the 1,2,4,5-tetrahydro-6H-pyrrolo[3,2,1-ij]-quinolin-6-one (XI) is reacted with sodium azide in the presence of polyphosphoric acid to form a mixture of 1,2,4,5 - tetrahydropyrrolo[3,2,1 - jk][1,4]benzodiazepin-7(6H)-one (V) and 1,2,4,5-tetrahydropyrrolo[1,2,3-ef][1,5]benzodiazepin-6(7H)-one (V'). These compounds are readily separated by conventional procedures, e.g., chromatography or fractional crystallization.

The preferred reaction temperature range is 50–60° C., however, higher or lower temperatures may be utilized if desired. The molar ratio of the ketone (XI) to sodium azide is preferably 1:1 to 1:2 and the reaction time is from 1 to 5 hours.

The indolines (VIII) utilized in Process E to prepare the 1,2,4,5 - tetrahydropyrrolo[3,2,1 - jk][1,4]benzodiazepin-7(6H)-ones (V) and the 1,2,4,5-tetrahydropyrrolo[1,2,3-ef][1,5]benzodiazepin - 6(7H) - ones (V') are either readily available commercially or may be prepared by known processes, e.g., that of Ikan el al., Israel J. Chem. 2, 37 (1964).

Process B

Process B is carried out by reducing a 1,2-dihydro-7-phenylpyrrolo[3,2,1-jk][1,4]benzodiazepin - 4(5H) - one (VI) with diborane or lithium aluminum hydride at 0–100° C. in the presence of an inert solvent such as ether, tetrahydrofuran or dioxane for a period of 1–18 hours. The product (II) can be recovered by conventional procedures such as crystallization, evaporation, chromatography and combinations thereof.

The 1,2-dihydro-7-phenylpyrrolo[3,2,1 - jk][1,4]benzodiazepin-4(5H)-ones (VI) utilized in Process B can be prepared by the method illustrated by the following flow scheme.

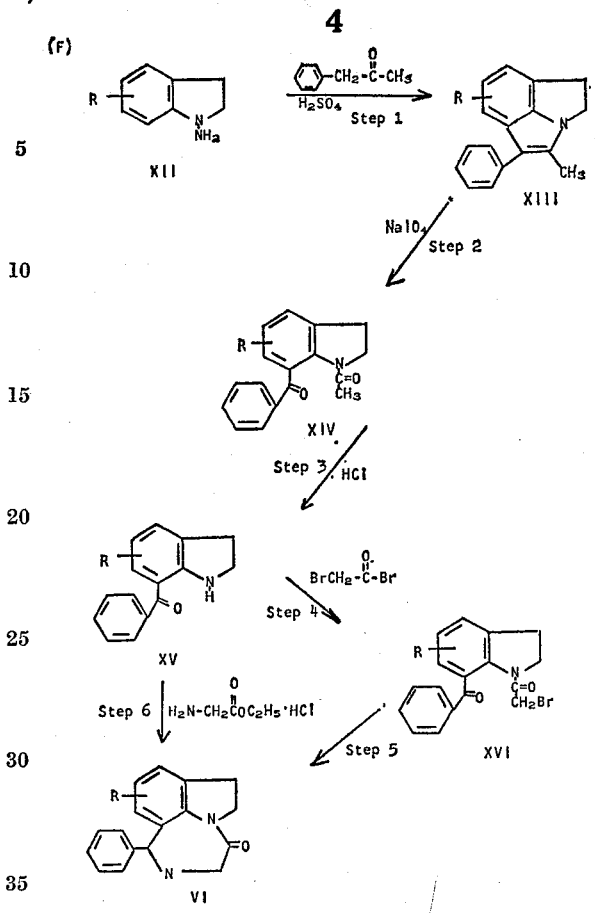

wherein R is the same as above.

In step 1 of Process F, a solution of 1-aminoindoline (XII), phenylacetone and acetic acid in benzene is refluxed for 1–5 hours with azeotropic distillation of water. The resulting solution is concentrated; the residue is treated with dilute sulfuric acid in water or ethanol and the resulting mixture is warmed to 50–100° C. for 10–30 minutes to yield the 1,2-dihydro-4-methyl-5-phenylpyrrolo [3,2,1-hi]indole (XIII).

In step 2, the 1,2-dihydro-4-methyl - 5 - phenylpyrrolo [3,2,1-hi]indole is mixed with sodium metaperiodate, water and dioxane and kept at 60–70° C. for 18–24 hours to give a 1-acetyl-7-benzoylindoline (XIV).

Step 3 involves refluxing a mixture of a 1-acetyl-7-benzoylindoline, 6 N hydrochloric acid and ethanol for 1–8 hours to yield a 7-benzoylindoline (XV).

The 1,2-dihydro-7-phenylpyrrolo[3,2,1 - jk][1,4]benzodiazepin-4(5H)-one (VI) can be prepared from (XV) by two methods.

The first method is illustrated by steps 4 and 5. In step 4, the 7-benzoylindole and bromoacetyl bromide in benzene is refluxed gently for 1–5 hours to yield a 1-(bromoacetyl)-7-benzoylindoline(XVI). A slow stream of nitrogen is passed through the system to remove hydrogen bromide formed in the reaction. This reaction can also be carried out at 0–25° C. in ether or benzene using an acid acceptor such as pyridine or triethylamine.

In step 5, the 1-(bromoacetyl)-7-benzoylindoline is dissolved in a solution of anhydrous ammonia in methanol and the solution is allowed to stand at 25° C. for 5–18 hours to yield VI.

The second method is illustrated by step 6 of Process F. The 7-benzoylindoline is refluxed with ethyl glycinate hydrochloride and dry pyridine for 18–24 hours to yield VI.

In both methods for preparing VI, the product is recovered from the reaction mixture by conventional procedures, such as crystallization, evaporation, distillation, chromatography and combinations thereof.

The 1-aminoindolines (XII) utilized as starting material in Process F can be prepared from the appropriately substituted indoline in accordance with the procedure illustrated by the following equations.

(G)

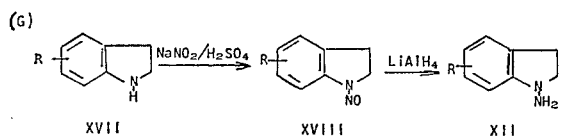

wherein R is the same as above. The details of this procedure are adequately described in Kost et al., J. Gen. Chem., 29, 3782 (1959). The indolines (XVII), many of which are known, can be prepared by known procedures.

Process C

In Process C, a 1,2,4,5,6,7-hexahydro-7-phenylpyrrolo[3,2,1-jk][1,4]benzodiazepine (II') is heated for 1–3 hours in an inert solvent such as p-cymene, naphthalene, quinoline or Decalin in the presence of a palladium catalyst at a temperature of 100–200° C. The product (III') can be recovered by conventional procedures such as crystallization, evaporation, chromatography and combinations thereof. This procedure cannot be utilized to prepare compounds of Formula III wherein R is halogen because of the removal of halogen substituents from the aromatic ring.

Process C'

Process C' is carried out by reducing a 4,5-dihydro-7-phenylpyrrolo[3,2,1-jk][1,4]benzodiazepine (XXII) with hydrogen and a platinum catalyst in a solvent such as methanol, ethanol or acetic acid at 1–4 atmospheres pressure and ambient temperature. Alternatively, reducing agents such as diborane or lithium aluminum hydride may be used at temperatures of 0–100° C. in inert solvents such as ether, tetrahydrofuran or dioxane for a period of 1–18 hours.

The 4,5-dihydro-7-phenylpyrrolo[3,2,1-jk][1,4]benzodiazepines (XXII) utilized in Process C' may be prepared by the following scheme:

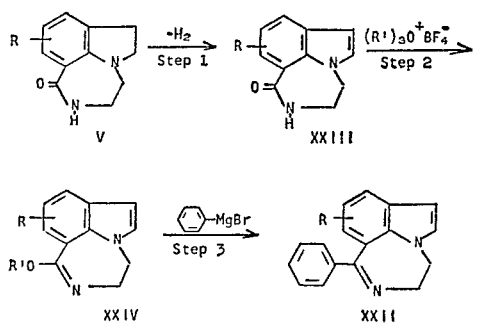

The 4,5-dihydropyrrolo[3,2,1-jk][1,4]benzodiazepin-7(6H)ones (XXIII) are prepared in step 1 by dehydrogenating the corresponding 1,2,4,5-tetrahydropyrrolo[3,2,1-jk][1,4]benzodiazepin-7(6H)-ones (V). The dehydrogenation may be performed by either of two procedures.

In the first procedure, the dehydrogenation is conducted by reacting the appropriate 1,2,4,5-tetrahydropyrrolo[3,2,1-jk]-[1,4]benzodiazepin-7(6H)-one (V) with a palladium catalyst in the presence of an inert solvent at a temperature of from 100–200° C. for a period of 1–3 hours. Solvents that can be used in this procedure include quinoline, decalin, p-cymene, naphthalene and mesitylene. The product is recovered by conventional procedures such as crystallization, evaporation, chromatography and combinations thereof. This procedure cannot be utilized to prepare compounds of Formula XXIII wherein R is halogen because the procedure removes halogen substituents from the aromatic ring.

In the second dehydrogenation procedure, the 1,2,4,5-tetrahydropyrrolo[3,2,1-jk][1,4]benzodiazepin-7(6H)-one (V) is refluxed with either chloranil or 2,3-dichloro-5,6-dicyano-1,4-benzoquinone in the presence of an inert solvent for 2–18 hours. Solvents that can be used in this procedure include benzene, toluene, xylene and the like. The product is recovered by conventional procedures such as crystallization, evaporation, chromatography and combinations thereof.

Step 2 is carried out by treating a solution or suspension of the appropriate 4,5-dihydropyrrolo[3,2,1-jk][1,4]benzodiazepin-7(6H)-one (XXIII) in an inert solvent such as methylene chloride, with a solution of trimethyl- or triethyloxonium fluoroborate in the same inert solvent and allowing the mixture to stand at 25–50° C. for 5–24 hours to yield the imino ether (XXIV).

Step 3 is carried out by adding a solution of phenylmagnesium bromide in diethyl ether to a solution of the imino ether (XXIV) in dibutyl ether. The diethyl ether is then removed by distillation and the resulting mixture is refluxed for 2–8 hours to yield the 4,5-dihydro-7-phenylpyrrolo[3,2,1-jk][1,4]benzodiazepines of Formula XXII. The product (XXII) is recovered from the reaction mixture by conventional procedures such as crystallization, evaporation, chromatography and combinations thereof.

Process D

Process D is carried out by reducing a 1,2-dihydro-6-phenylpyrrolo[1,2,3-ef][1,5]benzodiazepin-4(5H)-one (VII) with diborane in the presence of an inert solvent such as ether or tetrahydrofuran at a temperature of 0–60° C. for a period of 0.5–5 hours. The product IV can be recovered by conventional procedures such as crystallization, evaporation, chromatography and combinations thereof.

The 1,2-dihydro-6-phenylpyrrolo[1,2,3-ef][1,5-]benzodiazepin-4(5H)-ones (VII) utilized in Process D may be prepared by the process illustrated by the following equation:

(H)

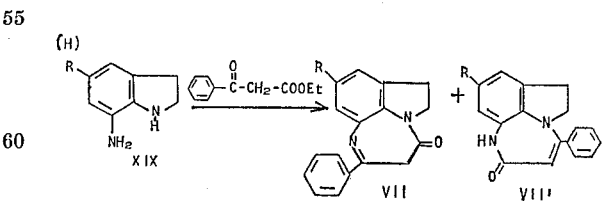

wherein R is the same as above.

In this process, a solution of ethyl benzoylacetate in xylene is slowly added to a boiling solution of the 7-aminoindoline (XIX) in xylene. During the addition and for an additional 30–60 minutes, the ethanol and water formed in the reaction are distilled from the mixture. The 1,2-dihydro-6-phenylpyrrolo[1,2,3-ef][1,5]benzodiazepin-4(5H)-ones (VII) and the 1,2-dihydro-4-phenylpyrrolo[1,2,3-ef][1,5]benzodiazepin-6(7H)-ones (VII') can be separated by virtue of their different solubility characteristics.

Compounds of Formula XIX wherein R is alkyl of from 1 to 3 carbon atoms, inclusive, alkoxy of from 1 to 3 carbon atoms, inclusive, bromo, chloro and fluoro are prepared by a process illustrated by the following equation:

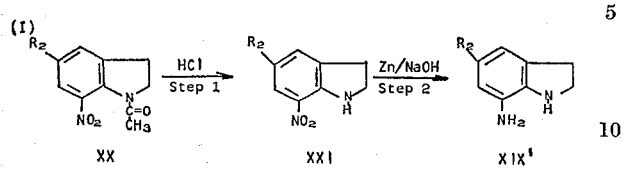

wherein $R_2$ is selected from the group consisting of alkyl of from 1 to 3 carbon atoms, inclusive, alkoxy of from 1 to 3 carbon atoms, inclusive, bromo, chloro and fluoro.

In step 1, a 1-acetyl-7-nitroindoline (XX) is refluxed with a mixture of 6 N hydrochloric acid and ethanol for 1–8 hours to give the corresponding 7-nitroindoline (XIX).

In step 2, a stirred refluxing mixture of the 7-nitroindoline, ethanol and 20% aqueous sodium hydroxide is treated portionwise with zinc dust at such a rate that the reflux temperature is maintained without external heating. After the addition, the mixture is refluxed for an additional hour to yield the corresponding 7-aminoindoline (XIX′).

Compound of Formula XIX wherein R is hydrogen can be prepared by the method described by Gall et al., J. Org. Chem. 20, 1538 (1955).

The 1-acetyl-7-nitroindolines XX are either readily available or can be prepared by methods well known in the art.

The acid addition salts of the invention comprise the salts of the compounds of Formulas I, II, III and IV with pharmacologically acceptable acids such as sulfuric hydrochloric, nitric, phosphoric, lactic, benzoic, methanesulfonic, p-toluenesulfonic, salicylic, acetic, propionic, maleic, malic, tartaric, citric, cyclohexanesulfamic, succinic, nicotinic, ascorbic acids, and the like.

The novel compounds of this invention exhibit tranquilizing and anticonvulsant activity. Activity was evaluated by use of the following tests.

Chimney Test [Med. Exp. 4, 11 (1961)]

This test determines the ability of mice to back up and out of a vertical glass cylinder within 30 seconds. Failure of mice to back up and out within this time indicates tranquilization.

Dish Test

Mice in Petri dishes (10 cm. diameter, 5 cm. high, partially embedded in wood shavings) climb out in a very short time, when not treated. Mice remaining in the dish for more than 3 minutes indicates tranquilization.

Pedestal Test

Mouse is placed on a pedestal. The untreated mouse leaves the pedestal in less than a minute to climb back to the floor of the standard mouse box. Tranquilized mice will stay more than 1 minute.

Nicotine Antagonism Test

Thirty minutes after mice in a group are treated with the test compound, both the treated and untreated mice are injected with 2 mg./kg. of nicotine salicylate. The untreated mice show overstimulation, i.e., (1) running convulsions followed by (2) tonic extensor fits, followed by (3) death. An effective nicotine antagonist will protect the treated mice against (2) and (3).

The results of the above tests utilizing some of the novel compounds of this invention (administered intraperitoneally) are set forth in the following table. The results are expressed in terms of the mg./kg. dosage at which the tested compounds exhibited the activity in 50% of the mice ($ED_{50}$).

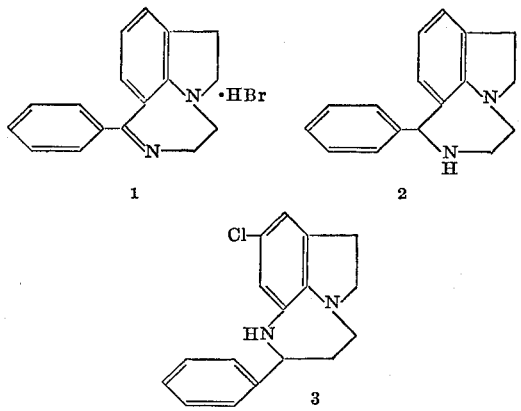

| Compound | 1 | 2 | 3 |
|---|---|---|---|
| Test: | | | |
| Chimney | 10 | | |
| Dish | 36 | 40 | |
| Pedestal | 50 | 45 | |
| N.A.[1]: | | | |
| TE [2] | 40 | 36 | 100 |
| D [3] | 40 | 36 | 100 |

[1] N.A.=Nicotine Antagonism.
[2] TE=Tonic Extensor Fits.
[3] D=Death.

For purposes of administration to birds and to mammals, including animals of economic value such as horses, cattle, sheep, pigs, mice, rats, rabbits and the like, the novel compounds of the invention can be combined with solid or liquid pharmaceutical carriers and formulated in the form of tablets, powder packets, capsules and the like solid dosage forms, using starch and like excipients, or dissolved in suitable solvents or vehicles for oral or parenteral administration.

Also, for mammals and birds food premixes, with starch, oatmeal, dried fishmeat, fishmeal, flour and the like can be prepared.

The novel compounds of this invention having the Formulas I, II, III and IV also form thiocyanic acid addition salts which, when condensed with formaldehyde, form resinous materials useful as pickling inhibitors according to U.S. Pats. 2,425,320 and 2,606,155. The fluosilicic acid addition salts are useful as mothproofing agents according to U.S. Pats. 1,915,334 and 2,075,359.

The following examples are set forth to illustrate my invention and to enable persons skilled in the art to better understand and practice the invention and are not intended to limit the same.

PREPARATION A 1,2,4,5 - tetrahydropyrrolo[3,2,1-jk][1,4]benzodiazepin-7(6H) - one and 1,2,4,5 - tetrahydropyrrolo[1,2,3-ef][1,5]benzodiazepin-6(7H)-one (a) MIXTURE OF 1,2,4,5-TETRAHYDROPYRROLO[3,2,1-jk][1,4]-BENZODIAZEPIN-7(6H)-ONE AND 1,2,4,5-TETRAHYDROPYRROLO[1,2,3-ef][1,5]BENZODIAZEPIN - 6 (7H)-ONE A stirred mixture of 15.0 g. (0.0867 mole) of 1,2,4,5-tetrahydro-6H-pyrrolo[3,2,1-ij]quinolin-6-one and 450 g. of polyphosphoric acid is warmed under nitrogen to 50° C. and treated over a period of one hour with 7.35 g. (0.113 mole) of sodium azide. The reaction mixture is stirred an additional 3.5 hours at 50° C. and then poured into 4 l. of ice water. The resulting mixture is stirred until solution is obtained. The solution is made alkaline with 50% aqueous sodium hydroxide and extracted with chloroform. The chloroform extract is washed with water, dried over anhydrous potassium carbonate and concentrated under reduced pressure to yield a mixture of 1,2,4,5-tetrahydropyrrolo[3,2,1 - jk][1,4]benzodiazepin-7(6H)-one and 1,2,4,5-tetrahydropyrrolo[1,2,3-ef][1,5]benzodiazepin-6(7H)-one.

(b) 1,2,4,5-TETRAHYDROPYRROLO[1,2,3-ef][1,5]BENZO-DIAZEPIN-6(7H)-ONE

The residue prepared in part (a) is chromatographed on 800 g. of silica gel (elution with 15% methanol–85% ethyl acetate) and the eluate is collected in 100-ml. fractions. Fractions 15–23 are combined and then recrystallized successively from ethyl acetate-Skellysolve B hexanes and methylene chloride-ethyl acetate to yield 1,2,4,5-tetrahydropyrrolo[1,2,3 - ef][1,5]benzodiazepin - 6(7H)-one, melting point 163–164° C.

Analysis.—Calcd. for $C_{11}H_{12}N_2O$ (percent): C, 70.18; H, 6.43; N, 14.88. Found (percent): C, 69.95; H, 6.67; N, 14.80.

(c) 1,2,4,5-TETRAHYDROPYRROLO[3,2,1-jk][1,4]BENZO-DIAZEPIN-7(6H)-ONE

Fractions 27–50 eluted during the chromatography in part (b) above are combined and recrystallized twice from ethyl acetate to yield 1,2,4,5-tetrahydropyrrolo-[3,2,1 - jk][1,4]benzodiazepin-7(6H)-one, melting point 151–152.5° C.

Analysis.—Calcd. for $C_{11}H_{12}N_2O$ (percent): C, 70.18; H, 6.43; N, 14.88. Found (percent): C, 70.31; H, 6.39; N, 15.08.

Using the procedure described in Preparation A, but replacing 1,2,4,5 - tetrahydropyrrolo[3,2,1-ij]quinolin-6-one by the appropriately substituted 1,2,4,5-tetrahydropyrrol[3,2,1-ij]quinolin-6-one is productive of the corresponding 1,2,4,5 - tetrahydropyrrolo[3,2,1-jk][1,4]benzodiazepin-7(6H)-one.

Representative of the 1,2,4,5-tetrahydropyrrolo[3,2,1-jk][1,4]benzodiazepin-7(6H)-ones so obtained are:

9-methyl-1,2,4,5-tetrahydropyrrolo-
9-ethyl-1,2,4,5-tetrahydropyrrolo-
9-methoxy-1,2,4,5-tetrahydropyrrolo-
9-chloro-1,2,4,5-tetrahydropyrrolo-
8-methyl-1,2,4,5-tetrahydropyrrolo-
10-methyl-1,2,4,5-tetrahydropyrrolo-
9-isopropyl-1,2,4,5-tetrahydropyrrolo-
9-bromo-1,2,4,5-tetrahydropyrrolo- and
9-fluoro-1,2,4,5-tetrahydropyrrolo[3,2,1-jk][1,4]-benzodiazepin-7(6H)-ones.

PREPARATION B

1,2-dihydro-4-methyl-5-phenylpyrrolo[3,2,1-hi]indole

A stirred mixture of 47.4 g. (0.353 mole) of 1-aminoindoline, 47.4 g. (0.353 mole) of phenylacetone, 7.05 ml. of acetic acid and 3.4 l. of benzene is refluxed under nitrogen for about 2 hours with azeotropic distillation of water. The solution is then concentrated under reduced pressure. A solution of the residue in 20% ethanolic sulfuric acid is warmed on the steam bath for about 10 minutes; a solid crystallizes from the reaction mixture during this period. The mixture is poured into ice water and stirred for about 45 minutes. The solid is collected by filtration and dried to give 48.3 g. of crude product, melting point 136–138° C. The filtrate is allowed to stand for 18 hours at room temperature. During this time additional product, 6.95 g., melting point 135.5–138° C. precipitates. Crystallization of the combined product from isopropanol gives 50.9 g. of product, melting point 138–140.5° C. Recrystallization of the product from 95% ethanol yields 1,2-dihydro-4-methyl-5-phenylpyrrolo[3,2,1-hi]indole, melting point 139–140° C.

Analysis.—Calcd. for $C_{17}H_{15}N$ (percent): C, 87.51; H, 6.48; N, 6.00. Found (percent): C, 87.30; H, 6.52; N, 6.00.

Using the procedure described in Preparation B, but replacing 1-aminoindoline by the appropriately substituted 1-aminoindoline is productive of the corresponding 1,2-dihydro-4-methyl - 5 - phenylpyrrolo[3,2,1-hi]indole. Representative of the indoles so obtained are:

1,2-dihydro-4,6-dimethyl-
1,2-dihydro-4,7-dimethyl-
1,2-dihydro-4,8-dimethyl-
1,2-dihydro-8-ethyl-4-methyl-
1,2-dihydro-8-propyl-4-methyl-
1,2-dihydro-8-isopropyl-4-methyl-
1,2-dihydro-6-methoxy-4-methyl-
1,2-dihydro-7-methoxy-4-methyl-
1,2-dihydro-8-methoxy-4-methyl-
1,2-dihydro-8-ethoxy-4-methyl-
1,2-dihydro-8-propoxy-4-methyl- and
1,2-dihydro-8-isopropoxy-4-methyl-5-phenylpyrrolo-[3,2,1-hi]indoles.

PREPARATION C

1-acetyl-7-benzoylindoline

A stirred mixture of 37.9 g. (0.163 mole) of 1,2-dihydro-4-methyl-5-phenylpyrrolo[3,2,1 - hi]indole, 87.0 g. (0.406 mole) of sodium metaperiodate, 1625 ml. of dioxane and 460 ml. of water is heated at 60° C., under nitrogen, for 20 hours. It is then poured into 5 l. of ice water and the resulting mixture is extracted with chloroform. The chloroform extract is washed with water, dried over anhydrous magnesium sulfate and concentrated in vacuo. The residue is chromatographed on 2.2 kg. of silica gel with ethyl acetate; 200-ml. fractions are collected. The material eluted in fractions 35–51 is crystallized from ethyl acetate to give 10.9 g. (24.8%) of crude product, melting point 142–143° C. The product is recrystallized from ethyl acetate to give 1-acetyl-7-benzoylindoline, melting point 142.5° C.

Analysis.—Calcd. for $C_{17}H_{15}NO_2$ (percent): C, 76.96; H, 5.70; N, 5.28. Found (percent): C, 76.89; H, 5.76; N, 5.53.

Using the procedure described in Preparation C, but replacing 1,2 - dihydro - 4 - methyl-5-phenylpyrolo[3,2,1-hi]indole by the appropriately substituted 1,2-dihydro-4-methyl-5-phenylpyrrolo[3,2,1-hi]indole is productive of the correspondingly substituted 1-acetyl-7-benzoylindoline. Representative of the 1-acetyl-8-benzoylindolines so obtained are:

1-acetyl-4-methyl-7-benzoylindoline
1-acetyl-5-methyl-7-benzoylindoline
1-acetyl-6-methyl-7-benzoylindoline
1-acetyl-4-ethyl-7-benzoylindoline
1-acetyl-4-propyl-7-benzoylindoline
1-acetyl-4-isopropyl-7-benzoylindoline
1-acetyl-4-methoxy-7-benzoylindoline
1-acetyl-5-methoxy-7-benzoylindoline
1-acetyl-6-methoxy-7-benzoylindoline
1-acetyl-4-ethoxy-7-benzoylindoline
1-acetyl-5-ethoxy-7-benzoylindoline
1-acetyl-4-propoxy-7-benzoylindoline and
1-acetyl-4-isopropoxy-7-benzoylindoline

PREPARATION D

7-benzoylindoline

A stirred mixture of 12.6 g. (0.0467 mole) of 1-acetyl-7-benzoylindoline (Preparation C), 380 ml. of 6 N hydrochloric acid and 760 ml. of absolute ethanol is refluxed under nitrogen for 5 hours and allowed to stand at room temperature for 18 hours. It is then poured into 4 l. of ice water and the resulting mixture is made ammoniacal. The crystalline product is collected by filtration, washed with water, dried and recrystallized from ethyl acetate-Skellysolve B hexanes to give 9.79 g. (84.5%) of 7-benzoylindoline, melting point 124–125° C.

Analysis.—Calcd. for $C_{15}H_{15}NO$ (percent): C, 80.69; H, 5.87; N, 6.27. Found (percent): C, 80.60; H, 5.93; N, 6.47.

Using the procedure described in Preparation D, but replacing 1-acetyl-7-benzoylindoline with the appropriately substituted 1-acetyl-7-benzoylindoline is productive of the correspondingly substituted 7-benzoylindoline. Representative of the 7-benzoylindolines so obtained are:

4-methyl-7-benzoylindoline 5-methyl-7-benzoylindoline
6-methyl-7-benzoylindoline
4-ethyl-7-benzoylindoline
4-propyl-7-benzoylindoline
4-isopropyl-7-benzoylindoline
5-methoxy-7-benzoylindoline
4-ethoxy-7-benzoylindoline
4-propoxy-7-benzoylindoline and
4-isopropoxy-7-benzoylindoline.

PREPARATION E

*1-(bromoacetyl)-7-benzoylindoline*

A stirred solution of 2.23 g. (0.01 mole) of 7-benzoylindoline (Preparation D) and pyridine (0.806 ml.; 0.01 mole) in 200 ml. of ether is treated, under nitrogen, with a solution of 2.24 g. (0.012 mole) of bromoacetyl bromide in a little ether. The resulting mixture is stirred at room temperature for 2.5 hours and poured into water. The solid product is collected by filtration, washed with water, dried in vacuo, and crystallized from ethyl acetate to give 2.43 g. of crude product. The ether layer is washed with water, dried over anhydrous potassium carbonate and concentrated. Crystallization of the residue from ethyl acetate gives 0.283 g. of additional crude product. The products are combined and recrystallized from ethyl acetate to yield 1-(bromoacetyl)-7-benzoylindoline, melting point 132.5–133° C.

*Analysis.*—Calcd. for $C_{17}H_{14}BrNO_2$ (percent): C, 59.32; H, 4.10; N, 4.07; Br, 23.22. Found (percent): C, 59.71; H, 3.95; N, 4.17; Br, 23.17.

Using the procedure described in Preparation E, but replacing 7-benzoylindoline by the appropriately substituted 7-benzoylindoline is productive of the correspondingly substituted 1-(bromoacetyl)-7-benzoylindoline. Representative of the 1-(bromoacetyl)-7-benzoylindolines so obtained are:

1-(bromoacetyl)-4-methyl-7-benzoylindoline
1-(bromoacetyl)-5-methyl-7-benzoylindoline
1-(bromoacetyl)-6-methyl-7-benzoylindoline
1-(bromoacetyl)-4-ethyl-7-benzoylindoline
1-(bromoacetyl)-4-propyl-7-benzoylindoline
1-(bromoacetyl)-4-isopropyl-7-benzoylindoline
1-(bromoacetyl)-5-methoxy-7-benzoylindoline
1-(bromoacetyl)-4-ethoxy-7-benzoylindoline
1-(bromoacetyl)-4-propoxy-7-benzoylindoline and
1-(bromoacetyl)-4-isopropoxy-7-benzoylindoline

PREPARATION F

*1,2-dihydro-7-phenylpyrrolo[3,2,1-jk][1,4]-benzodiazepin-4(5H)-one*

A solution of 1.0 g. (0.00299 mole) of 1 - (bromoacetyl)-7-benzoylindoline (Preparation E) in 100 ml. of tetrahydrofuran is mixed with 36 ml. of a 13% solution of ammonia in methanol, and the resulting solution is stirred at room temperature, under nitrogen, for 19 hours. It is then concentrated under reduced pressure at 25° C. The residue is mixed with water and extracted with methylene chloride. The extract is dried over anhydrous potassium carbonate and concentrated. Crystallization of the resulting product from ethyl acetate-Skellysolve B hexanes gives 0.63 g. of crude product. This product is recrystallized from ethyl acetate-Skellysolve B hexanes to give 1,2 - dihydro - 7 - phenylpyrrolo[3,2,1-jk][1,4]benzodiazepin-4(5H)-one, melting point 140–141.5° C.

*Analysis.*—Calcd. for $C_{17}H_{14}N_2O$ (percent): C, 77.84; H, 5.38; N, 10.68. Found (percent): C, 77.90; H, 5.29; N, 10.83.

Using the procedure described in Preparation F, but replacing 1-(bromoacetyl)-7-benzoylindoline by the appropriately substituted 1-(bromoacetyl)-7-benzoylindoline is productive of the correspondingly substituted 1,2-dihydro - 7-phenylpyrrolo[3,2,1 - jk][1,4]benzodiazepin-4(5H)-one. Representative of the 1,2-dihydro-7-phenyl-pyrrolo[3,2,1-jk][1,4]benzodiazepin-4(5H)-ones so obtained are:

1,2-dihydro-8-methyl-
1,2-dihydro-9-methyl-
1,2-dihydro-10-methyl-
1,2-dihydro-9-ethyl-
1,2-dihydro-9-propyl-
1,2-dihydro-9-isopropyl-
1,2-dihydro-8-methoxy-
1,2-dihydro-9-methoxy-
1,2-dihydro-10-methoxy-
1,2-dihydro-9-ethoxy-
1,2-dihydro-9-propoxy- and
1,2-dihydro-9-isopropoxy-7-phenylpyrrolo[3,2,1-jk][1,4]benzodiazepin-4(5H)-ones.

PREPARATION G

*1-acetyl-5-chloro-7-nitroindoline*

A stirred mixture of 66.9 g. (0.342 mole) of 1-acetyl-5-chloroindoline, 342 ml. of acetic anhydride and 136 ml. of acetic acid is cooled to 10–15° C. and treated during 15 minutes with a solution of 35.9 g. of fuming nitric acid in 34.2 ml. of acetic acid. The mixture is kept at 10–15° C. during the addition and for an additional 2 hours. It is then poured into cold water. The solid is collected by filtration, washed with water, dried and recrystallized from ethyl acetate to give two crops of crude product, 71.1 g., melting point 173.5–176° C., and 4.12 g., melting point 170–173.5° C. (91.4% total yield). Recrystallization of this product from ethyl acetate yields 1-acetyl-5-chloro-7-nitroindoline, melting point 174–175° C.

*Analysis.*—Calcd. for $C_{10}H_9ClN_2O_3$ (percent): C, 49.91; H, 3.77; N, 11.64; Cl, 14.74. Found (percent): C, 50.22; H, 4.07; N, 11.61; Cl, 14.75.

Using the procedure described in Preparation G, but replacing 1-acetyl-5-chloroindoline by the appropriately substituted 1-acetylindoline is productive of the corresponding 1-acetyl-7-nitroindoline. Representative of the 1-acetyl-7-nitroindolines so obtained are:

1-acetyl-5-fluoro-7-nitroindoline
1-acetyl-5-methyl-7-nitroindoline
1-acetyl-5-ethyl-7-nitroindoline
1-acetyl-5-propyl-7-nitroindoline
1-acetyl-5-isopropyl-7-nitroindoline
1-acetyl-5-methoxy-7-nitroindoline
1-acetyl-5-ethoxy-7-nitroindoline
1-acetyl-5-propoxy-7-nitroindoline
1-acetyl-5-isopropoxy-7-nitroindoline and
1-acetyl-5-bromo-7-nitroindoline.

PREPARATION H

*5-chloro-7-nitroindoline*

A stirred mixture of 3.62 g. (0.015 mole) of 1-acetyl-5-chloro-7-nitroindoline (Preparation G), 50 ml. of 6 N hydrochloric acid and 100 ml. of ethanol is refluxed under nitrogen for 2 hours, and allowed to stand at ambient temperature for 18 hours. The reaction mixture which contains crystalline product is poured into water. The solid is collected by filtration, washed with water, dried and recrystallized from ethyl acetate to give 2.67 g. (89.7%) of product. This product is recrystallized from ethyl acetate to give 5-chloro-7-nitroindoline, melting point 125–126° C.

*Analysis.*—Calcd. for $C_8H_7ClN_2O_2$ (percent): C, 48.37; H, 3.55; N, 14.11; Cl, 17.85. Found (percent): C. 48.42; H, 3.67; N, 14.19; Cl, 18.02.

Using the procedure described in Preparation H, but replacing 1-acetyl-5-chloro-7-nitroindoline by the appropriately substituted 1-acetyl-7-nitroindoline is productive of the corresponding 7-nitroindoline. Representative of the 7-nitroindolines so obtained are:

5-bromo-7-nitroindoline
5-methyl-7-nitrodindoline 5-ethyl-7-nitroindoline
5-propyl-7-nitroindoline
5-isopropyl-7-nitroindoline
5-methoxy-7-nitroindoline
5-ethoxy-7-nitroindoline
5-propoxy-7-nitroindoline and
5-isopropoxy-7-nitroindoline.

PREPARATION I

*7-amino-5-chloroindoline and hydrochloride thereof*

A stirred mixture of 19.9 g. (0.10 mole) of 5-chloro-7-nitroindoline (Preparation H), 52 ml. of 95% ethanol and 8 ml. of 20% aqueous sodium hydroxide is warmed under nitrogen to the reflux temperature and treated, portionwise, with 26 g. of zinc dust at such a rate that the mixture refluxes without external heating. At the end of addition, the mixture changes from red to light yellow. Additional ethanol (13 ml.) is added and the mixture is refluxed for 1 hour, cooled and filtered. The solid is washed with ether. The combined filtrate and washing is treated with a little sodium hydrosulfite and concentrated in vacuo. A suspension of the residue in water is extracted with ether. The extract is washed with a saturated aqueous solution of sodium chloride, dried over anhydrous potassium carbonate and concentrated in vacuo to yield 7-amino-5-chloroindoline as a residue.

A solution of the residue in ethanol is cooled in an ice bath and acidifiied with methanolic hydrogen chloride. The resulting crystalline solid is collected by filtration and washed with ethanol. A small amount of additional product is obtained by concentrating the filtrate. The combined product is recrystallized from ethanol (decolorizing charcoal treatment) to give 10.6 g., melting point 222° C. (dec.) and 0.849 g., melting point 219.5–221° C. (dec.) of product which is recrystallized from ethanol to yield 7-amino-5-chloroindoline hydrochloride, melting point 218.5–220° C. (dec.).

*Analysis.*—Calcd. for $C_8H_9ClN_2 \cdot HCl$ (percent): C, 46.85; H, 4.91; Cl, 34.58; N, 13.66. Found (percent): C, 46.85; H, 4.88; Cl, 34.80; N, 13.51.

Using the procedure described in Preparation I, but replacing 5-chloro-7-nitroindoline by the appropriately substituted 7-nitroindoline is productive of the corresponding 7-aminoindoline. Reperesentative of the 7-aminoindolines so obtained are:

7-amino-5-bromoindoline
7-amino-5-fluoroindoline
7-amino-5-methylindoline
7-amino-5-ethylindoline
7-amino-5-propylindoline
7-amino-5-isopropylindoline and
7-amino-5-methoxyindoline.

PREPARATION J

*9-chloro - 1,2 - dihydro - 6 - phenylpyrrolo[1,2,3-ef][1,5]
benzodiazepin-4(5H)-one and 9-chloro-1,2-dihydro-4-phenylpyrrolo[1,2,3-ef][1,5]benzodiazepin-6(7H)-one*

(a) MIXTURE OF 9-CHLORO-1,2-DIHYDRO-6-PHENYLPYRROLO[1,2,3-ef][1,5]BENZODIAZEPIN - 4(5H) - ONE AND 9 - CHLORO-1,2-DIHYDRO-4-PHENYLPYRROLO[1,2,3-ef][1,5]BENZODIAZEPIN-6(7H)-ONE

A solution of 2.05 g. (0.01 mole) of 7-amino-5-chloroindoline hydrochloride (Preparation I) in cold water is made alkaline with sodium hydroxide and extracted with ether. The extract is washed with brine, dried over anhydrous potassium carbonate and concentrated in vacuo. A solution of the residue in xylene (20 ml.) is heated to the reflux temperature, under nitrogen, and treated during 26 minutes with a solution of 1.92 g. (0.01 mole) of ethyl benzoylacetate in 10 ml. of xylene. During the addition and for an additional 36 minutes ethanol and water formed in the reaction are distilled from the mixture; the volume is kept constant by the addition of 9.5 ml. of fresh xylene. The mixture is cooled and diluted with Skellysolve B hexanes. The solid product is collected by filtration, washed with Skellysolve B hexanes and extracted with ether.

(b) 9-CHLORO-1,2-DIHYDRO-4-PHENYLPYRROLO[1,2,3-ef][1,5]BENZODIAZEPIN-6(7H)-ONE

The solid remaining after the ether extraction [Preparation J(a)] is dissolved in methylene chloride-methanol, decolorized with activated carbon and crystallized to give 0.299 g., melting point 279–282° C. and 0.043 g., melting point 277–281° C. (11.5% yield) of crude product. Recrystallization of this product from methylene chloride gives 9-chloro-1,2-dihydro-4-phenylpyrrolo[1,2,3-ef][1,5]benzodiazepin-6(7H)-one, melting point 280–281° C.

*Analysis.*—Calcd. for $C_{17}H_{13}ClN_2O$ (percent): C, 68.80; H, 4.41; N, 9.44; Cl, 11.95. Found (percent): C, 69.14; H, 4.89; N, 8.95; Cl, 12.06.

(c) 9-CHLORO-1,2-DIHYDRO-6-PHENYLPYRROLO[1,2,3-ef][1,5]BENZODIAZEPIN-4(5H)-ONE

The ether extract from Preparation J(a) is decolorized with activated carbon and crystallized to give 1.31 g. (44.3% yield) of crude product, melting point 123–126° C. This product is recrystallized from ether to yield 9-chloro - 1,2 - dihydro - 6 - phenylpyrrolo[1,2,3-ef][1,5]benzodiazepin-4(5H)-one, melting point 124.5–125.5° C.

*Analysis.*—Calcd. for $C_{17}H_{13}ClN_2O$ (percent): C, 68.80; H, 4.41; Cl, 11.95; N, 9.44. Found (percent): C, 69.02; H, 4.64; Cl, 12.14; N, 9.44.

Using the procedure of Preparation J, but replacing 7-amino-5-chloroindoline hydrochloride by the appropriately substituted 7-aminoindoline is productive of the corresponding 1,2-dihydro-6-phenylpyrrolo[1,2,3-ef][1,4]benzodiazepin-4(5H)-ones. Representative of the 1,2-dihydro - 6 - phenylpyrrolo[1,2,3-ef][1,4]benzodiazepin-4(5)-ones so obtained are:

1,2-dihydro-6-phenylpyrrolo-
9-bromo-1,2-dihydro-6-phenylpyrrolo-
9-fluoro-1,2-dihydro-6-phenylpyrrolo-
9-methyl-1,2-dihydro-6-phenylpyrrolo-
9-ethyl-1,2-dihydro-6-phenylpyrrolo-
9-propyl-1,2-dihydro-6-phenylpyrrolo-
9-methoxy-1,2-dihydro-6-phenylpyrrolo- and
9-ethoxy-1,2-dihydro-6-phenylpyrrolo[1,2,3-ef][1,5]
benzodiazepin-4(5H)-ones.

PREPARATION K

*4,5-dihydropyrrolo[3,2,1-jk][1,4]
benzodiazepin-7(6H)-one*

A stirred mixture of 23.8 g. (0.127 mole) of 1,2,4,5-tetrahydropyrrolo[3,2,1 - jk][1,4]benzodiazepin - 7(6H)-one [Preparation A(c)], 380 ml. of decalin and 11.5 g. of 10% palladium-on-carbon catalyst is refluxed under nitrogen for 1.5 hours. The mixture is cooled in an ice bath, diluted with 450 ml. of Skellysolve B hexanes and allowed to crystallize. The solid is collected by filtration, washed with Skellysolve B hexanes and extracted with methanol. The methanol extract is concentrated under reduced pressure, and the residue is crystallized from methanol-ethyl acetate to give 16.19 g. of crude product. This crude product is recrystallized from methanol-ethyl acetate to yield 4,5 - dihydropyrrolo[3,2,1-jk][1,4]benzodiazepin-7(6H)-one, melting point 173–174° C.

*Analysis.*—Calcd. for $C_{11}H_{10}N_2O$ (percent): C, 70.95; H, 5.41; N, 15.05. Found (percent): C, 71.34; H, 5.41; N, 15.01.

Using the procedure of Preparation K, but replacing 1,2,4,5 - tetrahydropyrrolo[3,2,1-jk][1,4]benzodiazepin-7(6H)-one by the appropriately substituted 1,2,4,5-tetrahydropyrrolo[3,2,1-jk][1,4]benzodiazepin-7(6H)-one is productive of the corresponding 4,5-dihydropyrrolo[3,2,1-jk][1,4-benzodiazepin-7(6H)-one. Representative of the 4,5-dihydropyrrolo[3,2,1-jk]benzodiazepin-7(6H)-ones so obtained are:

4,5-dihydro-9-methylpyrrolo-
4,5-dihydro-9-methoxypyrrolo-
4,5-dihydro-8-ethylpyrrolo-
4,5-dihydro-9-ethylpyrrolo- and
4,5-dihydro-10-ethylpyrrolo[3,2,1-jk][1,4]benzodiazepin-7(6H)-ones.

PREPARATION L

*7-ethoxy-4,5-dihydropyrrolo[3,2,1-jk][1,4] benzodiazepine and fluoroborate thereof*

A stirred solution of 3.72 g. (0.020 mole) of 4,5-dihydropyrrolo[3,2,1-jk][1,4]benzodiazepin - 7(6H) - one (Preparation K) in 100 ml. of dry methylene chloride is cooled in an ice bath, under nitrogen, and treated with 25 ml. of a methylene chloride solution of triethyloxonium fluoroborate containing 0.05 mole of the latter. The resulting solution is kept at ambient temperature for 19 hours, refluxed for 4 hours, cooled in an ice bath and treated with 7.92 g. of 50% aqueous potassium carbonate solution. The mixture is stirred for a few minutes and filtered through potassium carbonate. The filtrate is concentrated in vacuo, and the residue is crystallized from methylene chloride-ethyl acetate to give 4.67 g. of crude product. A second crop of crude product is obtained by crystallizing the mother liquor, using a small amount of silica gel to remove the contaminants. The two crops of product (total yield 82.7%) are combined and recrystallized from methylene chloride-ethyl acetate to yield 7-ethoxy-4,5-dihydropyrrolo[3,2,1 - jk][1,4]benzodiazepine fluoroborate, melting point 142–143.5° C.

*Analysis.*—Calcd. for $C_{13}H_{14}N_2O \cdot HBF_4$ (percent): C, 51.68; H, 5.01; N, 9.28; F, 25.16. Found (percent): C, 51.50; H, 4.82; N, 9.49; F, 24.77.

A stirred suspension of 3.02 g. (0.01 mole) of 7-ethoxy - 4,5 - dihydropyrrolo[3,2,1-jk][1,4]benzodiazepine fluoroborate (Preparation L) in about 50 ml. of diethyl ether is cooled in an ice bath and treated with dilute aqueous potassium carbonate solution. The mixture is stirred until the yellow solid dissolves. The aqueous layer is extracted with diethyl ether and the combined ether solution is washed with a saturated solution of sodium chloride, dried over anhydrous potassium carbonate and concentrated in vacuo. A solution of the residue in benzene is concentrated in vacuo to remove the last traces of water and give 7-ethoxy-4,5-dihydropyrrolo[3,2,1-jk]-[1,4]benzodiazepine as an oil.

Using the procedure described in Preparation L, but replacing 4,5 - dihydropyrrolo[3,2,1 - jk][1,4]benzodiazepin-7(6H)-one by the appropriately substituted 4,5-dihydropyrrolo[3,2,1-jk][1,4]benzodiazepin - 7(6H) - one and/or replacing triethyloxonium fluoroborate by trimethyloxonium fluoroborate is productive of other 7-alkoxy - 4,5 - dihydropyrrolo[3,2,1-jk][1,4]benzodiazepines and the fluoroborates thereof. Representative of the compounds so obtained are:

9-methyl-7-ethoxy-4,5-dihydropyrrolo-
9-methoxy-7-ethoxy-4,5-dihydropyrrolo-
9-chloro-7-ethoxy-4,5-dihydropyrrolo-
8-ethyl-7-ethoxy-4,5-dihydropyrrolo-
10-ethyl-7-ethoxy-4,5-dihydropyrrolo-
9-methyl-7-methoxy-4,5-dihydropyrrolo-
7,9-dimethoxy-4,5-dihydropyrrolo-
9-bromo-7-methoxy-4,5-dihydropyrrolo- and
7,8-dimethoxy-4,5-dihydropyrrolo[3,2,1-jk][1,4]benzodiazepines and fluoroborates thereof.

PREPARATION M

*4,5-dihydro-7-phenylpyrrolo[3,2,1-jk][1,4]benzodiazepine and hydrobromide thereof*

Diethyl ether is distilled, under nitrogen, from a solution of 5 ml. of 3 M ethereal phenylmagnesium bromide in 20 ml. of dibutyl ether. To the resulting refluxing solution is added, during 15 minutes, 15 ml. of a solution of 7-ethoxy - 4,5 - dihydropyrrolo[3,2,1-jk][1,4]benzodiazepine (Preparation L) in dibutyl ether. The resulting yellow suspension is refluxed for 8 hours, cooled and poured into ice water. This mixture is acidified with hydrochloric acid and filtered through diatomaceous earth. The filter cake is washed with dilute hydrochloric acid and the combined filtrate and washing is washed with diethyl ether. The aqueous layer is cooled in an ice bath, made alkaline with sodium hydroxide and extracted with diethyl ether. The ether extract is washed with a saturated solution of sodium chloride, dried over anhydrous potassium carbonate and concentrated in vacuo to give 4,5-dihydro - 7 - phenylpyrrolo[3,2,1-jk][1,4]benzodiazepine as a residue.

A solution of the residue in ethyl acetate is acidified with methanolic hydrogen bromide and the resulting salt is recrystallized from methanol-ethyl acetate (decolorizing charcoal treatment) to give 1.41 g. (43.1%) of 4,5-dihydro-7-phenylpyrrolo[3,2,1 - jk][1,4]benzodiazepine hydrobromide, melting point 272.5–274.5° C.

Using the procedure described in Preparation M, but replacing 7-ethoxy-4,5-dihydropyrrolo[3,2,1-jk][1,4]benzodiazepine by the appropriately substituted 7-alkoxy-4,5-dihydropyrrolo[3,2,1-jk][1,4]benzodiazepine is productive of the corresponding 4,5-dihydro-7-phenylpyrrolo[3,2,1-jk][1,4]benzodiazepines and hydrobromides thereof. Representative of the compounds so obtained are:

4,5-dihydro-9-methyl-7-phenylpyrrolo-
4,5-dihydro-9-methoxy-7-phenylpyrrolo-
9-chloro-4,5-dihydro-7-phenylpyrrolo-
4,5-dihydro-8-ethyl-7-phenylpyrrolo-
4,5-dihydro-9-ethyl-7-phenylpyrrolo-
4,5-dihydro-10-ethyl-7-phenylpyrrolo-
9-bromo-4,5-dihydro-7-phenylpyrrolo- and
4,5-dihydro-8-fluoro-7-phenylpyrrolo[3,2,1-jk][1,4]benzodiazepines and hydrobromides thereof.

EXAMPLE 1

*7-ethoxy-1,2,4,5-tetrahydropyrrolo[3,2,1-jk][1,4] benzodiazepine*

A stirred solution of 3.76 g. (0.020 mole) of 1,2,4,5-tetrahydropyrrolo[3,2,1 - jk][1,4]benzodiazepin - 7(6H)-one (Preparation A) in 100 ml. of dry methylene chloride is cooled in an ice bath, under nitrogen, and treated with 25 ml. (0.05 mole) of a methylene chloride solution of triethyloxonium fluoroborate. The resulting solution is kept at ambient temperature for 14 hours, refluxed for 4 hours, cooled in an ice bath and treated with 7.92 g. of 50% aqueous potassium carbonate. This mixture is stirred for a few minutes and filtered through a pad of potassium carbonate. The filtrate is concentrated in vacuo. A suspension of the residue in petroleum ether is filtered through a pad of silica gel. The filtrate is concentrated and crystallized at 0° C. to yield 2.69 g. (62.2%) of crude product. This product is recrystallized from petroleum ether at 0° C. to yield 7-ethoxy-1,2,4,5-tetrahydropyrrolo[3,2,1-jk][1,4]benzodiazepine, melting point 47.5–49° C.

*Analysis.*—Calcd. for $C_{13}H_{16}N_2O$ (percent): C, 72.19; H, 7.46; N, 12.95. Found (percent): C, 72.33; H, 7.82; N, 13.05.

Using the procedure described in Example 1, but replacing 1,2,4,5 - tetrahydropyrrolo[3,2,1 - jk][1,4]benzodiazepin - 7(6H) - one by the appropriately substituted 1,2,4,5 - tetrahydropyrrolo[3,2,1 - jk][1,4]benzodiazepin-7(6H) - one is productive of the corresponding 7 - ethoxy - 1,2,4,5 - tetrahydropyrrolo[3,2,1 - jk][1,4]benzodiazepine. Also, the corresponding 7-methoxy - 1,2,4,5-tetrahydropyrrolo[3,2,1 - jk][1,4]benzodiazepines can be prepared by replacing triethyloxonium fluoroborate by trimethyloxonium fluoroborate in the procedure described in Example 1. Representative of the 7-ethoxy- and 7- methoxy - 1,2,3,4 - tetrahydropyrrolo[3,2,1 - jk][1,4] benzodiazepines so obtained are:

9-methyl-7-ethoxy-1,2,4,5-tetrahydro-
9-ethyl-7-ethoxy-1,2,4,5-tetrahydro-
7-ethoxy-9-methoxy-1,2,4,5-tetrahydro-
7,9-diethoxy-1,2,4,5-tetrahydro-
9-chloro-7-ethoxy-1,2,4,5-tetrahydro-
8-methyl-7-ethoxy-1,2,4,5-tetrahydro-
10-methyl-7-ethoxy-1,2,4,5-tetrahydro-
9-methyl-7-methoxy-1,2,4,5-tetrahydro-
9-isopropyl-7-methoxy-1,2,4,5-tetrahydro-
9-bromo-7-methoxy-1,2,4,5-tetrahydro-
9-fluoro-7-methoxy-1,2,4,5-tetrahydro-
7,8-dimethoxy-1,2,4,5-tetrahydro- and
7,10-dimethoxy-1,2,4,5-tetrahydropyrrolo[3,2,1-jk] [1,4]benzodiazepines.

EXAMPLE 2

*1,2,4,5-tetrahydro-7-phenylpyrrolo[3,2,1-jk][1,4] benzodiazepine and hydrobromide thereof*

Diethyl ether is distilled, under nitrogen, from a solution of 12.9 ml. of 3 M ethereal phenylmagnesium bromide in 60 ml. of dibutyl ether and the resulting refluxing solution is treated during 15 minutes with a solution of 5.55 g. (0.0257 mole) of 7-ethoxy - 1,2,4,5 - tetrahydropyrrolo[3,2,1 - jk][1,4]benzodiazepine (Example 1) in 25 ml. of dibutyl ether. This mixture is refluxed for 8 hours, cooled and poured into ice water. The resulting mixture is acidified with hydrochloric acid and filtered; the filtrate is washed with ether. The aqueous solution is cooled in an ice bath, made alkaline with sodium hydroxide and extracted with ether. The ether extract is washed with a saturated aqueous solution of sodium chloride, dried over anhydrous potassium carbonate and concentrated in vacuo to yield 1,2,4,5 - tetrahydro - 7-phenylpyrrolo[3,2,1-jk][1,4]benzodiazepine as a residue.

A solution of the 1,2,4,5 - tetrahydro - 7 - phenylpyrrolo[3,2,1 - jk][1,4]benzodiazepine in ethyl acetate is acidified with methanolic hydrogen bromide and the salt is crystallized to give 3.13 g. (37.1%) of crude product. This product is recrystallized from ethanol-ethyl acetate to yield 1,2,4,5 - tetrahydro - 7 - phenylpyrrolo[3,2,1-jk][1,4]benzodiazepine hydrobromide, melting point 245.5–246.5° C.

*Analysis.*—Calcd. for $C_{17}H_{16}N_2 \cdot HBr$ (percent): C, 62.01; H, 5.21; Br, 24.27; N, 8.51. Found (percent): C, 62.40; H, 5.21; Br, 24.28; N, 8.35.

Using the procedure described in Example 2, but replacing 7 - ethoxy - 1,2,4,5 - tetrahydropyrrolo[3,2,1-jk] [1,4]benzodiazepine by the appropriately substituted 7-ethoxy- or 7-methoxy - 1,2,4,5 - tetrahydropyrrolo[3,2,1-jk][1,4]benzodiazepine is productive of the corresponding 7 - phenyl - 1,2,4,5 - tetrahydropyrrolo[3,2,1 - jk] [1,4]benzodiazepine. Representative of the benzodiazepines so obtained are:

9-methyl-7-phenyl-1,2,4,5-tetrahydro-
9-ethyl-7-phenyl-1,2,4,5-tetrahydro-
7-phenyl-9-propyl-1,2,4,5-tetrahydro-
9-methoxy-7-phenyl-1,2,4,5-tetrahydro-
9-ethoxy-7-phenyl-1,2,4,5-tetrahydro-
9-chloro-7-phenyl-1,2,4,5-tetrahydro-
8-bromo-7-phenyl-1,2,4,5-tetrahydro-
10-fluoro-7-phenyl-1,2,4,5-tetrahydro-
8-methyl-7-phenyl-1,2,4,5-tetrahydro- and
10-methyl-7-phenyl-1,2,4,5-tetrahydropyrrolo[3,2,1-jk] [1,4]benzodiazepines.

EXAMPLE 3

*1,2,4,5,6,7-hexahydro-7-phenylpyrrolo[3,2,1-jk][1,4] benzodiazepine*

11.0 g. (0.0418 mole) of 1,2-dihydro-7-phenylpyrrolo- [3,2,1 - jk][1,4]benzodiazepin - 4(5H) - one (Preparation F) is added under nitrogen to an ice-cold, stirred suspension of 11 g. of lithium aluminum hydride in 1.1 l. of tetrahydrofuran and the resulting mixture is refluxed for 18 hours, cooled in an ice bath and treated successively with 11 ml. of water, 11 ml. of 15% aqueous sodium hydroxide and 33 ml. of water. This mixture is stirred for a few minutes and filtered. The filtrate is concentrated in vacuo and the residue is crystallized from ethyl acetate-Skellysolve B hexanes to give 8.88 g. of crude product. This product is recrystallized from ethyl acetate-Skellysolve B hexanes to give 1,2,4,5,6,7 - hexahydro - 7 - phenylpyrrolo[3,2,1 - jk][1,4]benzodiazepine, melting point 102–103.5° C.

*Analysis.*—Calcd. for $C_{17}H_{18}N_2$ (percent): C, 81.56; H, 7.25; N, 11.19. Found (percent): C, 81.57; H, 7.20; N, 11.12.

Using the procedure described in Example 3, but replacing 1,2-dihydro - 7 - phenylpyrrolo[3,2,1-jk][1,4]benzodiazepin-4(5H)-one by the appropriately substituted 1,2-dihydro - 7 - phenylpyrrolo[3,2,1-jk][1,4]benzoiazepin- 4(5H)-one is productive of the corresponding 1,2,4,5,6,7-hexahydro - 7 - phenylpyrrolo[3,2,1-jk][1,4]benzodiazepine. Representative of the benzodiazepines so obtained are:

1,2,4,5,6,7-hexahydro-8-methyl-
1,2,4,5,6,7-hexahydro-9-methyl-
1,2,4,5,6,7-hexahydro-10-methyl-
9-ethyl-1,2,4,5,6,7-hexahydro-
1,2,4,5,6,7-hexahydro-9-isopropyl
1,2,4,5,6,7-hexahydro-8-methoxy-
1,2,4,5,6,7-hexahydro-9-methoxy-
1,2,4,5,6,7-hexahydro-10-methoxy-
9-ethoxy-1,2,4,5,6,7-hexahydro-
1,2,4,5,6,7-hexahydro-9-propoxy-
1,2,4,5,6,7-hexahydro-10-isopropoxy-
9-bromo-1,2,4,5,6,7-hexahydro-
9-chloro-1,2,4,5,6,7-hexahydro- and
9-fluoro-1,2,4,5,6,7-hexahydro-7-phenylpyrrolo- [3,2,1-jk][1,4]benzodiazepines.

EXAMPLE 4

*4,5,6,7 - tetrahydro - 7 - phenylpyrrolo[3,2,1-jk][1,4]benzodiazepine and hydrochloride thereof; and 4,5-dihydro-7-phenylpyrrolo[3,2,1-jk][1,4]benzodiazepine and hydrobromide thereof*

A stirred mixture of 5.0 g. (0.02 mole) of 1,2,4,5,6,7-hexahydro - 7 - phenylpyrrolo[3,2,1-jk]]1,4[benzodiazepine (Example 3), 2.5 g. of 10% palladium-on-carbon catalyst and 100 ml. of Decalin is refluxed under nitrogen for 1.5 hours, cooled and filtered through diatomaceous earth. The solid is washed with ether and the combined filtrate and washing is acidified with cold dilute hydrochloric acid. The organic layer is separated from the aqueous layer and an insoluble gum, and is washed with dilute hydrochloric acid. The combined acidic aqueous solution and gum is washed with ether, treated with methylene chloride and made alkaline with sodium hydroxide. The aqueous layer is extracted with methylene chloride and the combined methylene chloride solution is washed with water, dried over anhydrous potassium carbonate and concentrated. The residue is chromatographed on 250 g. of silica gel with 2% triethylamine–48% ethyl acetate– 50% cyclohexane to yield basic material which is converted to 1.48 g. of crystalline hydrobromide. This hydrobromide, a mixture of two compounds, is converted to free base and is then rechromatographed on 100 g. of silica gel with 40% ethyl acetate-60% cyclohexane, 50-ml. fractions being collected.

(a) 4,5,6,7 - TETRAHYDRO - 7 - PHENYLPYRROLO[3,2,1-jk][1,4]BENZODIAZEPINE AND HYDROCHLORIDE THEREOF

The first compound, 4,5,6,7-tetrahydro-7-phenylpyrrolo- [3,2,1-jk][1,4]benzodiazepine is eluted in fractions 16–23. This eluate is concentrated, acidified with methanolic hydrogen chloride and crystallized from methanol-ethyl acetate to yield 0.223 g. of crude product. The crude product is recrystallized twice from methanol-ethyl acetate to yield 4,5,6,7-tetrahydro-7-phenylpyrrolo[3,2,1-jk] [1,4]benzodiazepine hydrochloride, melting point 276° C. (dec.).

Analysis.—Calcd. for $C_{17}H_{16}N_2 \cdot HCl$ (percent): C, 71.69; H, 6.02; Cl, 12.45; N, 9.84. Found (percent): C, 71.38; H, 5.96; Cl, 12.49; N, 9.35.

(b) 4,5 - DIHYDRO - 7 - PHENYLPYRROLO[3,2,1-jk] [1,4] BENZODIAZEPINE AND HYDROBROMIDE THEREOF

Elution of the product, 4,5-dihydro-7-phenylpyrrolo-[3,2,1-jk][1,4]benzodiazepine, begins with fraction 26, and is continued until the elution is complete.

The base thus obtained is treated with methanolic hydrogen bromide and crystallized from methanol-ethyl acetate to give 0.897 g. of the crude hydrobromide. The crude hydrobromide is recrystallized from methanol-ethyl acetate to give 4,5-dihydro-7-phenylpyrrol[3,2,1-jk][1,4] benzodiazepine hydrobromide, melting point 275° C. (dec.).

Analysis.—Calcd. for $C_{17}H_{14}N_2 \cdot HBr$ (percent): C, 62.39; H, 4.62; Br, 24.42; N, 8.56. Found: (percent): C, 62.41; H, 4.73; Br, 24.01; N, 8.74.

Using the procedure described in Example 4, but replacing 1,2,4,5,6,7 - hexahydro-7-phenylpyrrolo[3,2,1-jk] [1,4]benzodiazepine by the appropriately substituted 1,2, 4,5,6,7-hexahydro - 7 - phenylpyrrolo[3,2,1-jk][1,4]benzodiazepine is productive of the corresponding 4,5,6,7-tetrahydro - 7 - phenylpyrrolo[3,2,1-jk][1,4]benzodiazepine. Representative of the benzodiazepines so obtained are:

9-methyl-7-phenyl-4,5,6,7-tetrahydropyrrolo-
9-methoxy-7-phenyl-4,5,6,7-tetrahydropyrrolo-
9-propyl-7-phenyl-4,5,6,7-tetrahydropyrrolo-
8-ethyl-7-phenyl-4,5,6,7-tetrahydropyrrolo-
9-ethyl-7-phenyl-4,5,6,7-tetrahydropyrrolo-
10-ethyl-7-phenyl-4,5,6,7-tetrahydropyrrolo-
9-isopropyl-7-phenyl-4,5,6,7-tetrahydropyrrolo- and
8-propoxy-7-phenyl-4,5,6,7-tetrahydropyrrolo[3,2,1-jk] [1,4]benzodiazepines.

EXAMPLE 5

9-chloro-1,2,4,5,6,7-hexahydro-6-phenylpyrrolo[1,2,3-ef][1,5]benzodiazepine and hydrochloride thereof A stirred solution of 14.8 g. (0.05 mole) of 9-chloro-1,2-dihydro - 6 - phenylpyrrolo[1,2,3-ef][1,5]benzodiazepin-4(5H)-one (Preparation J) in 300 ml. of dry tetrahydrofuran is cooled in an ice-bath, under nitrogen, and treated with 150 ml. of a 1 M solution of diborane in tetrahydrofuran. This solution is allowed to remain in the ice bath for 1.5 hours and is refluxed for 2.5 hours. It is then cooled in an ice-bath, treated with 22.5 ml. of 6 N hydrochloric acid and concentrated in vacuo. The residue is suspended in ether and water and made alkaline with sodium hydroxide. The aqueous layer is extracted with ether and the combined ether layers are washed with a saturated aqueous solution of sodium chloride, dried over anhydrous potassium carbonate and concentrated in vacuo to yield 9-chloro-1,2,4,5,6,7-hexahydro-6-phenylpyrrolo[1,2,3-ef][1,5]benzodiazepine as a residue.

A solution of the residue in ethyl acetate is acidified with methanolic hydrogen chloride and the resulting salt is recrystallized from methanol-ethyl acetate to give 11.53 g. (71.8%) of crude product. This product is recrystallized from 95% ethanol to give 9-chloro-1,2,4,5,6,7-hexahydro - 6 - phenylpyrrolo[1,2,3-ef][1,5]benzodiazepine hydrochloride, melting point 208.5–209.5° C. (dec.).

Analysis.—Calcd. for $C_{17}H_{17}ClN_2 \cdot HCl$ (percent): C, 63.56; H, 5.65; N, 8.72; Cl, 22.07. Found (percent): C, 63.47; H, 5.58; N, 8.72; Cl, 22.03.

Using the procedure of Example 5, but replacing 9-chloro - 1,2 - dihydro - 6 - phenylpyrrolo[1,2,3-ef][1,5] benzodiazepin-4(5H)-one by the appropriately substituted 1,2-dihydro - 6 - phenylpyrrolo[1,2,3-ef][1,5]benzodiazepin-4(5H)-one is productive of the corresponding 1,2,4,5,6,7-hexahydro - 6 - phenylpyrrolo[1,2,3-ef][1,5] benzodiazepine. Representative of the 1,2,4,5,6,7-hexahydro - 6 - phenylpyrrolo[1,2,3-ef][1,5]benzodiazepines so obtained are:

1,2,4,5,6,7-hexahydro-6-phenylpyrrolo-
1,2,4,5,6,7-hexahydro-9-methyl-6-phenylpyrrolo-
9-ethyl-1,2,4,5,6,7-hexahydro-6-phenylpyrrolo-
1,2,4,5,6,7-hexahydro-9-methoxy-6-phenylpyrrolo-
9-ethoxy-1,2,4,5,6,7-hexahydro-6-phenylpyrrolo-
9-chloro-1,2,4,5,6,7-hexahydro-6-phenylpyrrolo- and
9-bromo-1,2,4,5,6,7-hexahydro-6-phenylpyrrolo [1,2,3-ef][1,5]benzodiazepines.

EXAMPLE 6

4,5,6,7-tetrahydro-7-phenylpyrrolo[3,2,1-jk][1,4] benzodiazepine and hydrochloride thereof A mixture of 0.723 g. of 4,5-dihydro-7-phenylpyrrolo-[3,2,1-jk][1,4]benzodiazepine hydrobromide (Preparation M), 100 mg. of platinum oxide catalyst and 50 ml. of 95% ethanol is hydrogenated at an initial pressure of 42 p.s.i. for 4 hours and 50 minutes. The catalyst is removed by filtration and the filtrate is concentrated in vacuo. The residue is mixed with dilute aqueous sodium hydroxide and extracted with methylene chloride. The extract is washed with water, dried over anhydrous potassium carbonate and concentrated to give 4,5,6,7-tetrahydro - 7 - phenylpyrrolo[3,2,1-jk][1,4]benzodiazepine as a residue. An ethyl acetate solution of this product is acidified with ethereal hydrogen chloride and the salt is crystallized from methanol-ethyl acetate to give 0.155 g. of 4,5,6,7 - tetrahydro-7-phenylpyrrolo[3,2,1-jk][1,4] benzodiazepine hydrochloride, melting point 275.5–277.5° C. This material is identical by IR and NMR spectra to the authentic sample prepared in Example 4.

Using the procedure described in Example 6, but replacing 4,5-dihydro-7-phenylpyrrolo[3,2,1-jk][1,4]benzodiazepine hydrobromide by the appropriately substituted 4,5-dihydro - 7 - phenylpyrrolo[3,2,1-jk][1,4]benzodiazepine hydrobromide is productive of the corresponding 4,5,6,7 - tetrahydro-7-phenylpyrrolo[3,2,1-jk][1,4]benzodiazepine hydrochloride. Representative of the benzodiazepines so obtained are:

9-methyl-7-phenyl-4,5,6,7-tetrahydropyrrolo-
9-methoxy-7-phenyl-4,5,6,7-tetrahydropyrrolo-
9-chloro-7-phenyl-4,5,6,7-tetrahydropyrrolo-
9-bromo-7-phenyl-4,5,6,7-tetrahydropyrrolo- and
9-fluoro-7-phenyl-4,5,6,7-tetrahydropyrrolo[3,2,1-jk] [1,4]benzodiazepine hydrochlorides.

I claim:
1. A compound selected from the group consisting of
(a) compounds having the formulae

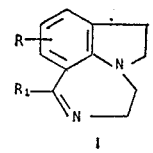
I

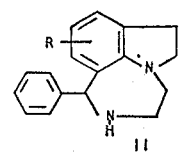
II

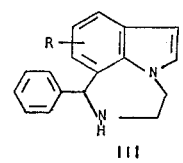
III

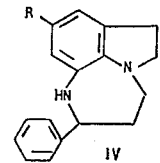
IV wherein R is selected from the group consisting of hydrogen, alkyl of from 1 to 3 carbon atoms, inclusive, alkoxy of from 1 to 3 carbon atoms, inclusive, bromo, chloro and fluoro; and $R_1$ is methoxy, ethoxy or phenyl; and (b) the addition salts with pharmacologically acceptable acids of the compounds of the above formulae.

2. A compound of claim 1 having the formula of I.
3. A compound of claim 2 wherein R is hydrogen and $R_1$ is ethoxy.
4. A compound of claim 2 wherein R is hydrogen and $R_1$ is phenyl.
5. The hydrobromide of the compound of claim 4.
6. A compound of claim 1 having the formula of II.
7. A compound of claim 6 wherein R is hydrogen.
8. A compound of claim 1 having the formula of III.
9. A compound of claim 8 wherein R is hydrogen.
10. The hydrochloride of the compound of claim 9.
11. A compound of claim 1 having the formula of IV.
12. A compound of claim 11 wherein R is 9-chloro.
13. The hydrochloride of the compound of claim 12.

References Cited

Theilheimer: Synthetic Methods of Organic Chemistry, 20:132 (1966).

Smith: Open-Chain Nitrogen Compounds (1965), vol. 1, p. 175.

ALEX MAZEL, Primary Examiner

J. A. NARCAVAGE, Assistant Examiner

U.S. Cl. X.R.

260—239.3 T, 289 R, 313.1, 326.11, 326.9; 424—274, 232, 200